United States Patent
Shah et al.

(10) Patent No.: US 12,140,449 B2
(45) Date of Patent: Nov. 12, 2024

(54) USAGE OF TRANSFORMED MAP DATA WITH LIMITED THIRD PARTY KNOWLEDGE

(71) Applicant: QUALCOMM Incorporated, San Diego, CA (US)

(72) Inventors: Himanshu Shah, Milpitas, CA (US); Gautam Nirula, Pleasanton, CA (US); Hsiao Chien Liang, San Jose, CA (US); William Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/814,116

(22) Filed: Jul. 21, 2022

(65) Prior Publication Data
US 2024/0027227 A1    Jan. 25, 2024

(51) Int. Cl.
*G01C 21/00*    (2006.01)
*G01C 21/34*    (2006.01)

(52) U.S. Cl.
CPC ......... *G01C 21/3885* (2020.08); *G01C 21/34* (2013.01)

(58) Field of Classification Search
CPC .... G01C 21/3885; G01C 21/34; G01C 21/30; H04W 12/02; H04W 12/63
See application file for complete search history.

(56) References Cited

U.S. PATENT DOCUMENTS

| | | | |
|---|---|---|---|
| 2015/0100269 A1* | 4/2015 | Ashjaee | G01S 19/42 702/150 |
| 2016/0203199 A1* | 7/2016 | Eppley | H04W 4/029 707/756 |

(Continued)

FOREIGN PATENT DOCUMENTS

| | | | | |
|---|---|---|---|---|
| CN | 109029472 A | | 12/2018 | |
| CN | 109211250 A | | 1/2019 | |
| CN | 107977366 B | * | 12/2021 | ........... G06F 1/3234 |

OTHER PUBLICATIONS

Wikipedia. "Restrictions on geographic data in China." Jan. 8, 2020. Retrieved from Wayback Machine. URL: https://web.archive.org/web/20200108012022/https://en.wikipedia.org/wiki/Restrictions_on_geographic_data_in_China. Section: Coordinate Systems. (Year: 2020).*

(Continued)

*Primary Examiner* — Hunter B Lonsberry
*Assistant Examiner* — Henry R Hinton
(74) *Attorney, Agent, or Firm* — Procopio, Cory, Hargreaves & Savitch LLP/Qualcomm

(57) ABSTRACT

Aspects presented herein may improve the performance of positioning devices by enabling the positioning devices to utilize transformed map data with limited third party knowledge of the transformation. Aspects presented herein may enable a positioning device to make the map data from another coordinate system usable for positioning algorithms without knowledge of the transformation. In one aspect, a UE transmits a request for map data based on a first set of (Continued)

coordinates in a first coordinate system. The UE receives the map data based on a second set of coordinates in a second coordinate system, where the first set of coordinates in the first coordinate system is distinct from the second set of coordinates in the second coordinate system. The UE calculates a set of relative distances between the second set of coordinates and one or more objects corresponding to the map data.

24 Claims, 12 Drawing Sheets

(56) References Cited

U.S. PATENT DOCUMENTS

| | | | | |
|---|---|---|---|---|
| 2017/0336214 | A1* | 11/2017 | Lynch | G01C 21/34 |
| 2021/0133198 | A1* | 5/2021 | Dupey | G06F 16/24575 |
| 2021/0174139 | A1* | 6/2021 | Ozog | G06V 20/56 |
| 2022/0024482 | A1* | 1/2022 | Yang | G01S 13/867 |

OTHER PUBLICATIONS

International Search Report and Written Opinion—PCT/US2023/023359—ISA/EPO—Oct. 10, 2023.

* cited by examiner

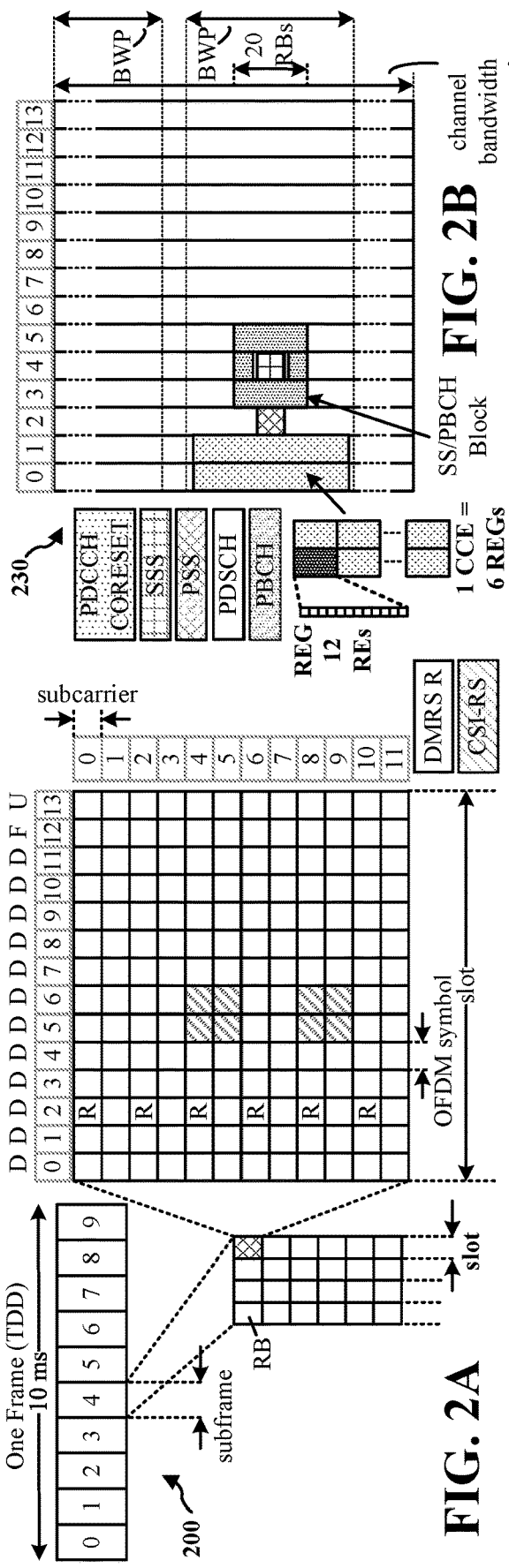
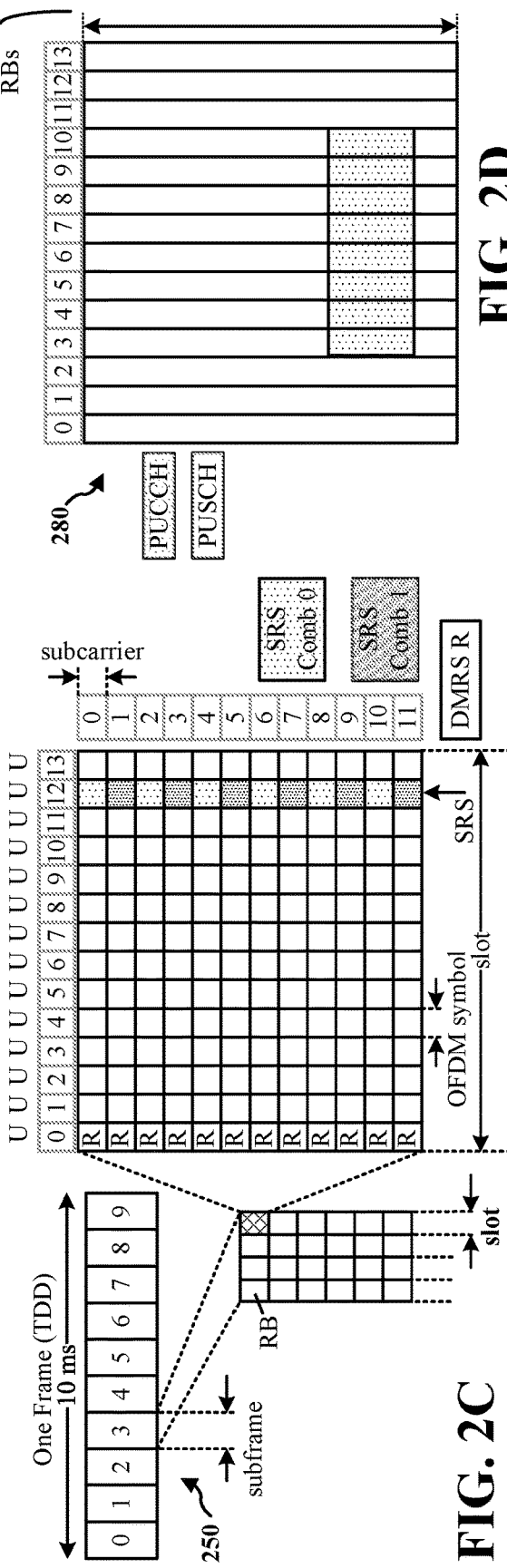
FIG. 2A
FIG. 2B
FIG. 2C
FIG. 2D

USAGE OF TRANSFORMED MAP DATA WITH LIMITED THIRD PARTY KNOWLEDGE

TECHNICAL FIELD

The present disclosure relates generally to positioning systems, and more particularly, to positioning systems involving navigation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits a request for map data based on a first set of coordinates in a first coordinate system. The apparatus receives the map data based on a second set of coordinates in a second coordinate system, where the first set of coordinates in the first coordinate system is distinct from the second set of coordinates in the second coordinate system. The apparatus calculates a set of relative distances between the second set of coordinates and one or more objects corresponding to the map data.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
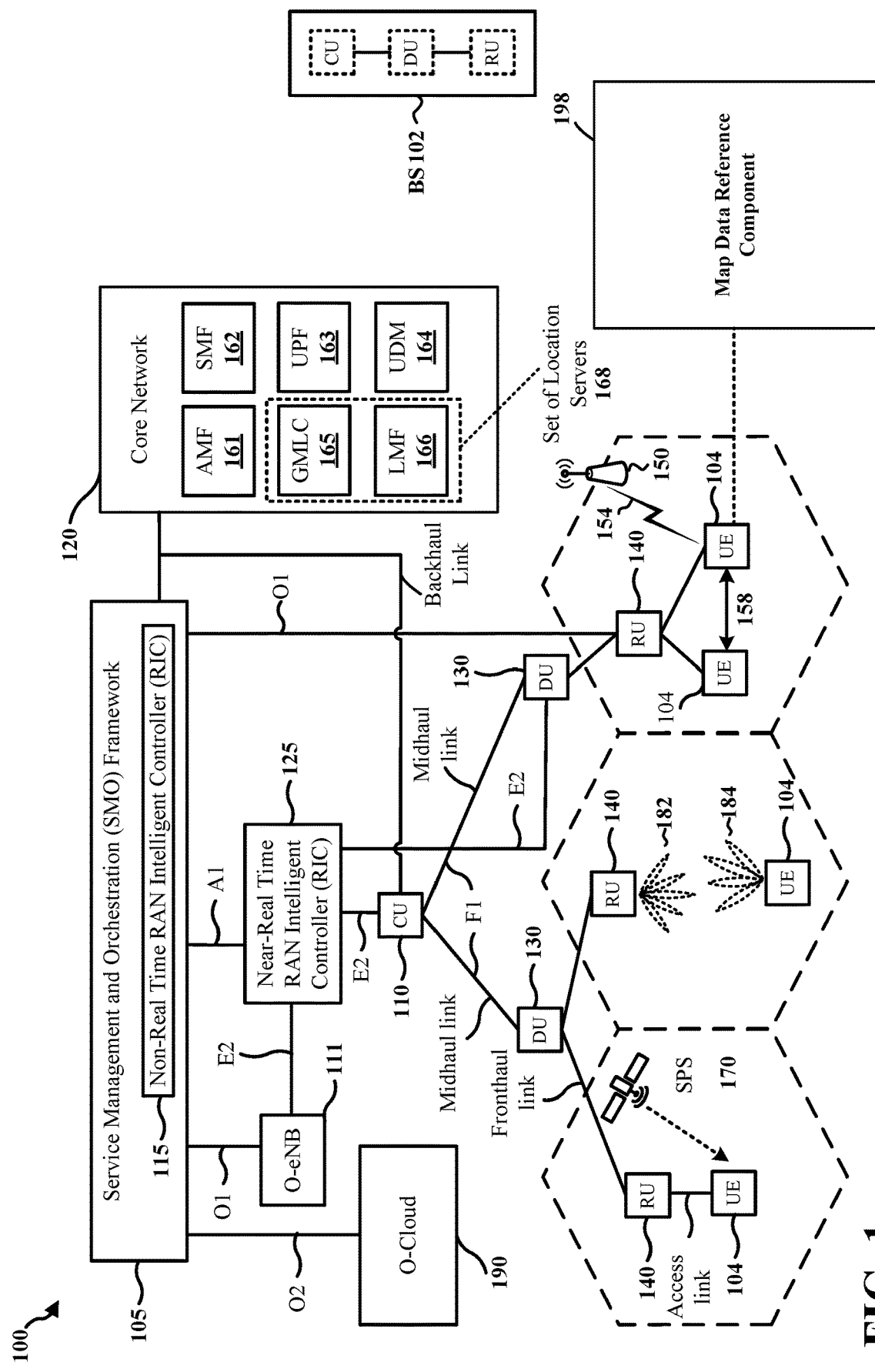
FIG. 1 is a diagram illustrating an example of a wireless communications system and an access network.

Aspects presented herein may improve the performance of positioning devices, such as mobile devices, wearables, IoT devices, etc., by enabling the positioning devices to utilize transformed map data with limited third party knowledge of the transformation. Aspects presented herein may enable a positioning device to make the map data from another coordinate system not supported by the positioning device usable for positioning algorithms without knowledge of the transformation (e.g., without knowing there is a transformation of the coordinates).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to transmit a request for map data based on a first set of coordinates in a first coordinate system; receive the map data based on a second set of coordinates in a second coordinate system, where the first set of coordinates in the first coordinate system is distinct from the second set of coordinates in the second coordinate system; and calculate a set of relative distances between the second set of coordinates and one or more objects corresponding to the map data.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
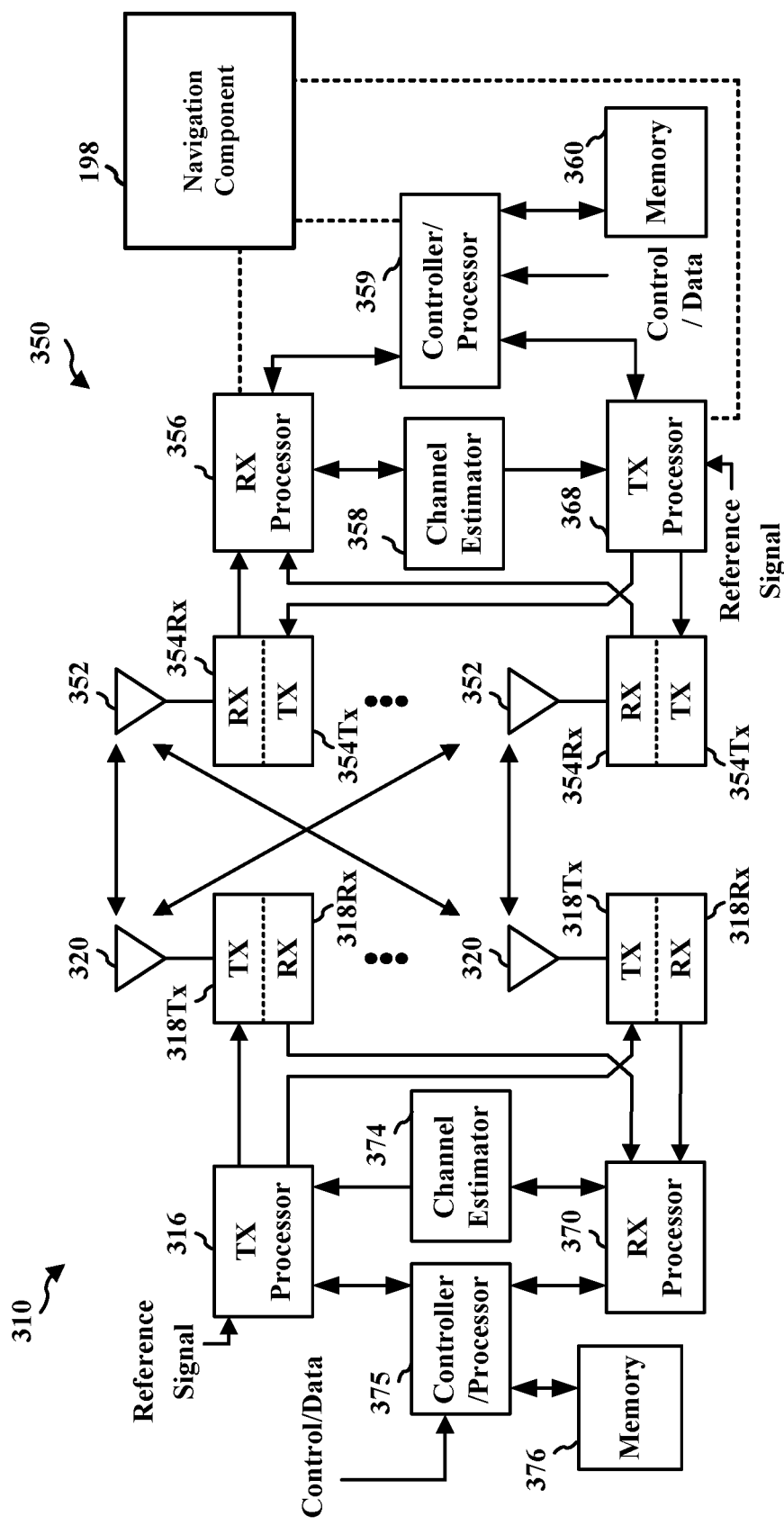
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the map data reference component 198 of FIG. 1.

Figure 4:
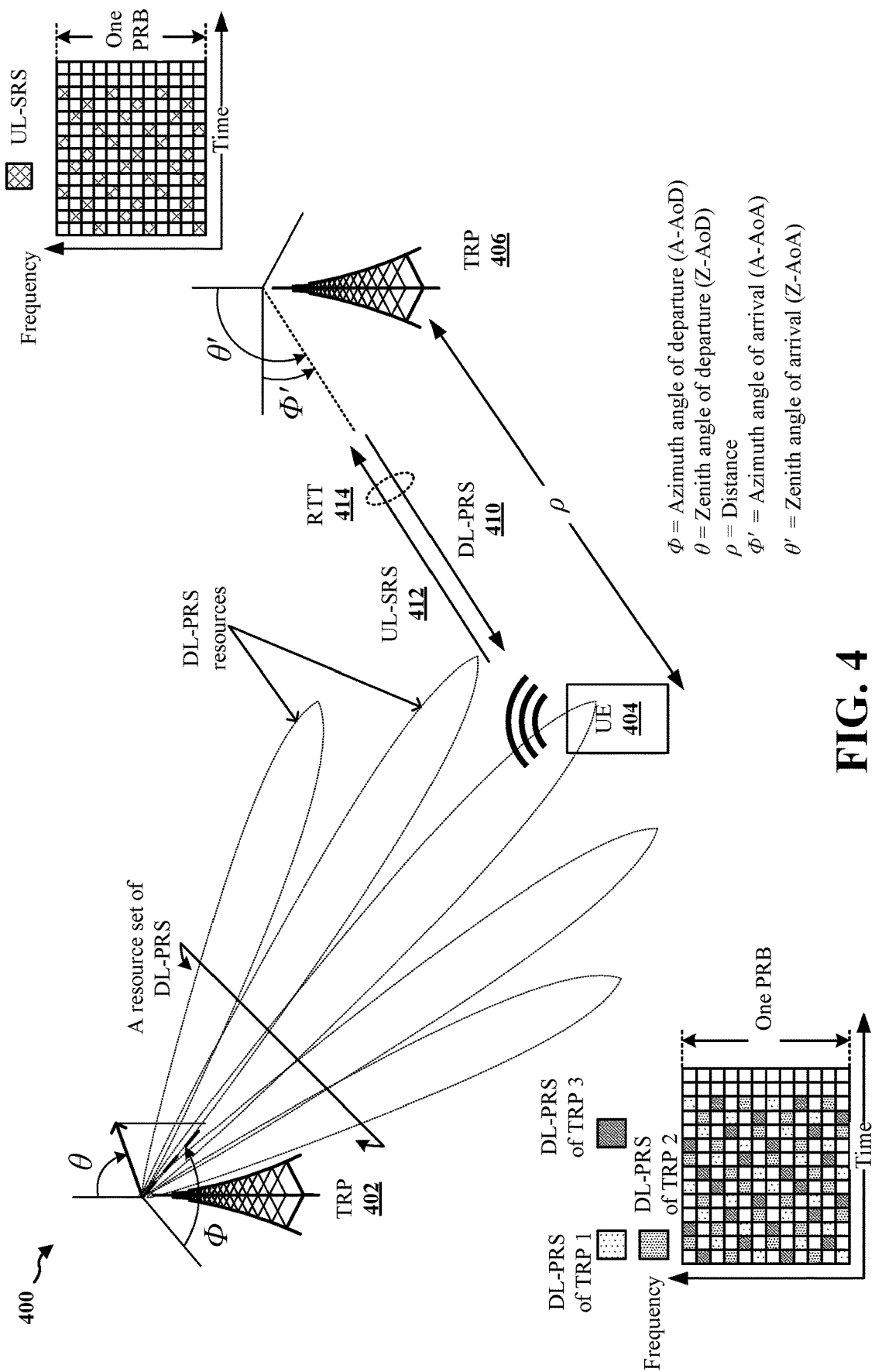
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX} - T_{PRS\_TX}\| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and/or DL-PRS-RSRP of the received signals) using assistance data received from the positioning server, and the TRPs 402, 406 measure the gNB Rx-Tx time difference measurements (and/or UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL-PRS-RSRP) of downlink signals received from multiple TRPs 402, 406 at the UE 404. The UE 404 measures the DL RSTD (and/or DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL-SRS-RSRP) at multiple TRPs 402, 406 of uplink signals transmitted from UE 404. The TRPs 402, 406 measure the UL-RTOA (and/or UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

A device equipped with a global navigation satellite system (GNSS) receiver may determine its location on Earth based on GNSS measurements (which may also be referred to as "GNSS-based positioning"). GNSS is a network of satellites broadcasting timing and orbital information used for navigation and positioning measurements. GNSS may include multiple groups of satellites, known as constellations, that broadcast signals (which may be referred to as GNSS signals) to control stations and users of GNSS. Based on the broadcast signals, the users may be able to determine their locations (e.g., via trilateration). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

For example, a GNSS device may determine its geographic coordinate in latitude, longitude, and altitude in a coordinate system based on GNSS signals received from satellites. A coordinate system, which may also be referred to as a spatial reference system (SRS) or a coordinate reference system (CRS), is a framework/system used by a GNSS device to precisely measure locations on the surface of the Earth as coordinates. A reference system may include a choice of Earth ellipsoid, horizontal datum, map projection, origin point, and/or unit of measure, etc. Thousands of coordinate systems have been specified for use around the world or in specific regions. For example, a GPS receiver uses the World Geodetic System (WGS) (also known as WGS 1984 or WGS-84 for its latest version) for its coordinate system, which consists of a reference ellipsoid, a standard coordinate system, altitude data, and a geoid. The WGS uses the Earth's center mass as the coordinate origin and has an uncertainty that is less than 2 cm.

Different coordinate systems may provide different coordinates for a same location or provide different locations for a same coordinate. For example, GCJ-02 or BD-09 is another coordinate system that is based on the WGS-84 coordinate system. The GCJ-02/BD-09 coordinate system uses an obfuscation algorithm which adds random offsets to both the latitude and longitude (e.g., for purposes of improving national security). As such, there may be a distance offset (or a drift) between a coordinate on the WGS-84 coordinate system and the same coordinate on the GCJ-02/BD-09 coordinate system. For example, GCJ-02/BD-09 coordinates (e.g., coordinates obtained based on GCJ-02/BD-09 coordinate system) may be displayed at the correct location on a GCJ-02/BD-09 map. However, the distance offsets may result in a 100-meter to 700-meter error from the actual location if a WGS-84 coordinate is placed on the GCJ-02/BD-09 map, or vice versa. Thus, a GNSS device may not be able to determine its location precisely if corresponding coordinate system and/or map data is not used.

Figure 5:
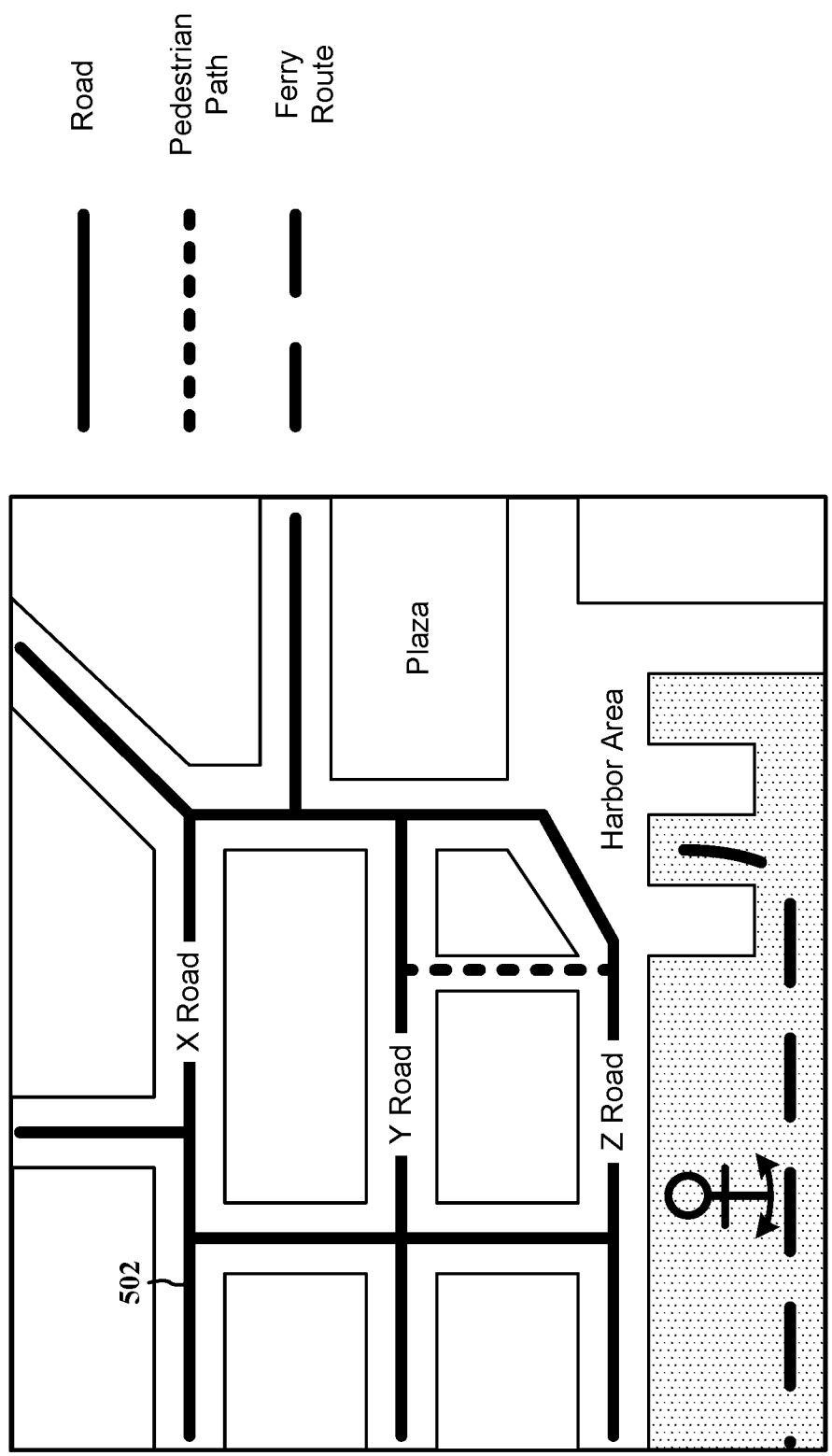
FIG. 5 is a diagram illustrating an example of map data on a corresponding coordinate system in accordance with various aspects of the present disclosure.

FIG. 5 is a diagram 500 illustrating an example of map data on a corresponding coordinate system in accordance with various aspects of the present disclosure. For purposes of the present disclosure, a map data may include information on any geo-referenced object on a map (e.g., roads, ped paths, ferry routes, etc.), which may be available in many formats (e.g., line segments, pixels, etc.). This may include relative distance of the objects on the map which may be obtained with reference to a set of co-ordinates. In one example, map data of a region may be available as a group of line segments that represent different geographic features of the region, such as roads, pedestrian paths, ferry routes, etc. These line segments may also be provided as road coordinates. When a coordinate system is used in association with the corresponding (or the correct) map data (e.g., using GCJ-02 coordinates on GCJ-02 map), the group of line segments in the map data may correctly match/align with the actual geographic features in the region. For example, the line segment 502 representing X road may correctly align with the actual X road in the region, and the line segment representing Y road may correctly align with the actual Y road in the region, etc.

Figure 6:
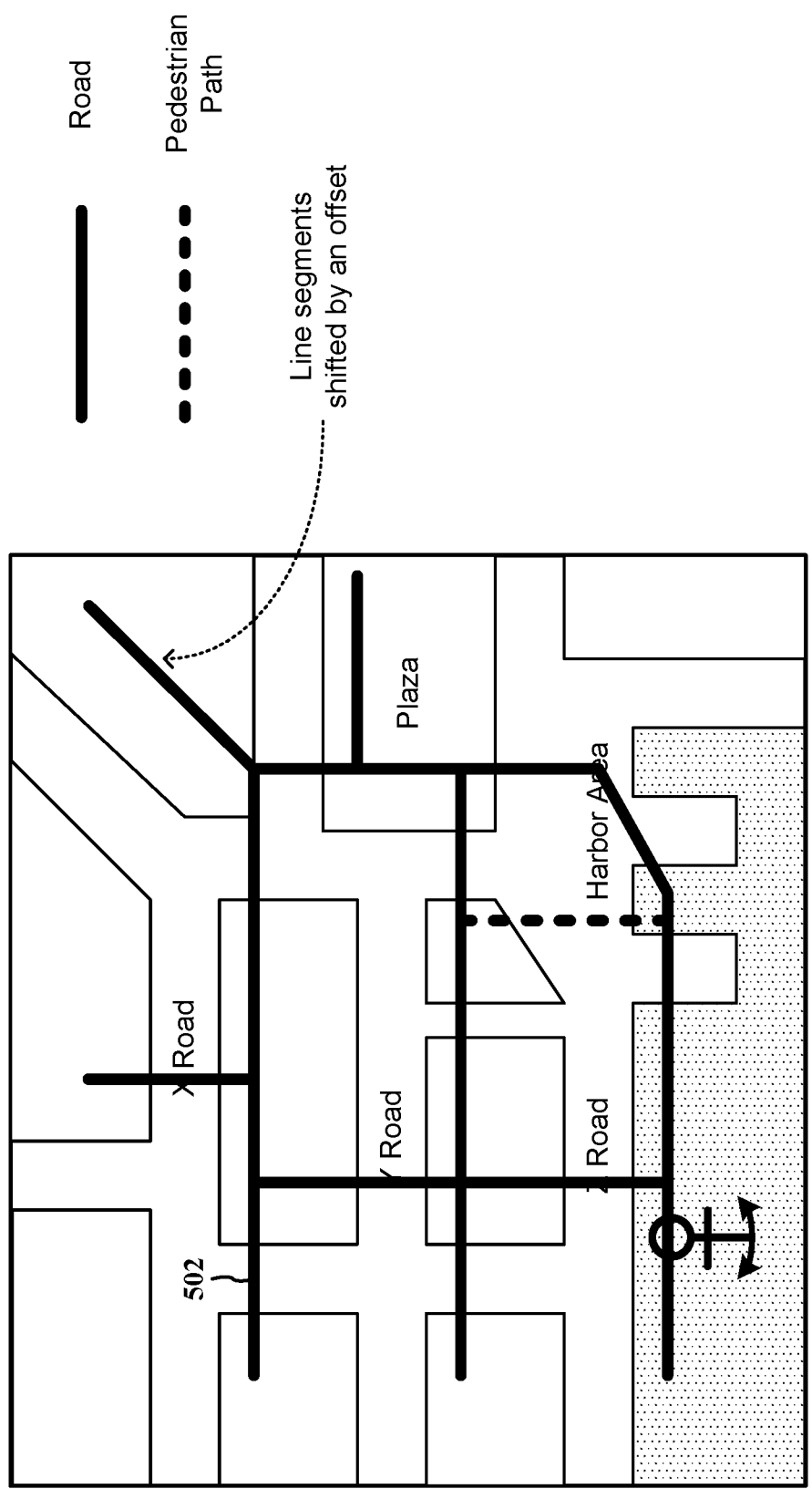
FIG. 6 is a diagram illustrating an example of map data not on a corresponding coordinate system in accordance with various aspects of the present disclosure.

FIG. 6 is a diagram 600 illustrating an example of map data not on a corresponding coordinate system in accordance with various aspects of the present disclosure. On the other hand, when a coordinate system is not used in association with the corresponding (or the correct) map data (e.g., using WGS-84 coordinates on GCJ-02 map), the group of line segments in the map data may not correctly match with the actual geographic features in the region. For example, the line segment 502 representing the X road may be shift from the actual X road in the region by a distance offset (e.g., X meters in longitudinal direction and Y meters in latitudinal direction, etc.).

To obtain the correct location or the correct map data using coordinates obtained from a first coordinate system on a second coordinate system, a GNSS device (or a map data client/provider) may be configured/designed with the capability to convert the coordinates obtained via the first coordinate system to corresponding coordinates on the second coordinate system, which may be referred to as the "transformation." For example, a GNSS device may transform WGS-84 coordinates to GCJ-02 coordinates and use the transformed coordinates on the GCJ-02 map data, such that the GNSS device may correct identify its geographic location based on the GCJ-02 map data as shown by FIG. 5. However, in certain geographies, transformation of coordinates from one coordinate system to another system may specify specific algorithm, and may be illegal without a valid license. For example, in certain regions, transformation of WGS-84 coordinates to GCJ-02 coordinates may be available with a valid license, and transformation of GCJ-02 coordinates to WGS-84 coordinates may be strictly prohibited and illegal.

In some scenarios, map data for certain regions may just be available for one coordinate system but not available on another coordinate system. For example, there may be map data of a region available for the GCJ-02 coordinate system but not available for the WGS-84 coordinate system. As such, to use the map data of the region, a GNSS device may be specified to either use the GCJ-02 coordinate system (e.g., if the GNSS device supports the GCJ-02 coordinate system) or convert the coordinates of another coordinate system to the GCJ-02 coordinates before using the map data (e.g., if the GNSS does not support the GCJ-02 coordinate system). However, in certain regions, the algorithm for transforming the coordinates between different coordinate systems or the existence of the transformation in a mapping application may not be disclosed to the public (e.g., it may be illegal to do so). As such, map data for certain geographies may just be available in a transformed coordinate system with an unknown transformation (e.g., geographies that are specified to use GCJ-02 coordinate system). Also, it may not be possible for manufacturers to integrate a transformed map data directly into a positioning software/application on mobile devices such as UEs, wearables, IoT devices, etc. if the transformation is unknown.

A positioning/navigation application (or software) may refer to an application in a user equipment (UE) (e.g., a navigation system, a smartphone, etc.) that provides positioning or navigational directions to a user in real time. A positioning/navigation application may include a variety of positioning/navigation functions which may be used for improving the positioning/navigation provided by the application. For example, navigation functions may include guiding a user to a destination based on a fastest or a shortest route, fitting a user to a closest road when the exact position of the user is unable to be determined (e.g., based on a "snap-to-road" feature), and/or avoiding navigating a user via certain areas (e.g., toll roads, blocked road, roads under constructions, etc.). Over the last few years, users have increasingly relied on positioning/navigation applications because they have provided various benefits. For purposes of the present disclosure, a navigation map may refer to a map that corresponds to a specific area of the real world, such that the navigation map be used by a positioning/navigation application for navigating (e.g., guiding) the user via a display when the user is in that specific area. A navigation map may include multiple layers, where each layer may convey different types of information. For example, a first layer of a navigation map may convey geographic (e.g., terrain) information, a second layer of a navigation map may convey road information, and a third layer of a navigation map may convey building information, etc.

Figure 7:
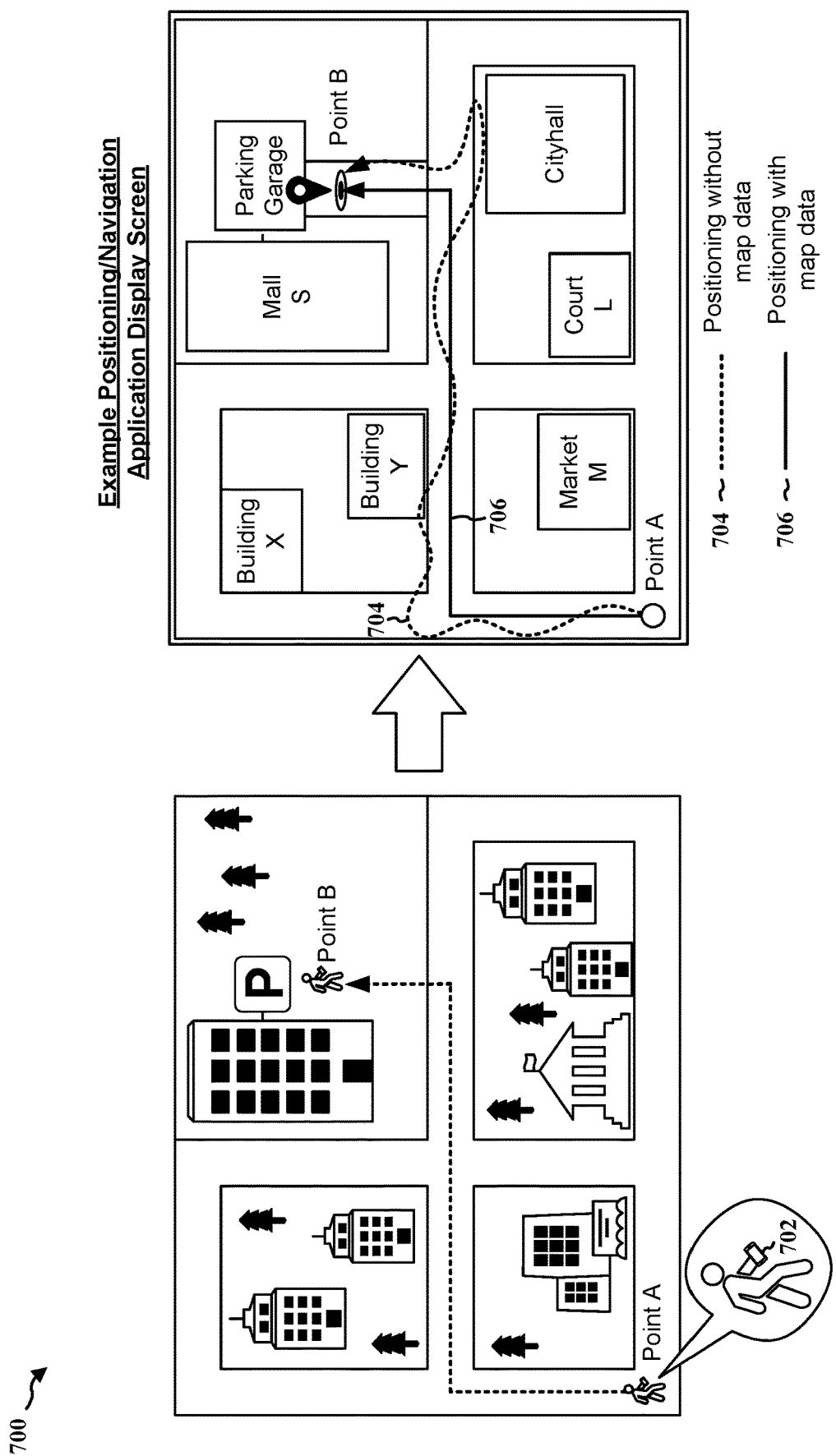
FIG. 7 is a diagram illustrating an example of using map data from a map provider to improve the performance of a positioning/navigation application in accordance with various aspects of the present disclosure.

In some examples, map data from a map provider (e.g., a third party map vendor) may be used by a positioning/navigation application to improve the performance of positioning and/or the navigation. FIG. 7 is a diagram 700 illustrating an example of using map data from a map provider to improve the performance of a positioning/navigation application in accordance with various aspects of the present disclosure. A user with a GNSS device 702 (e.g., a UE with a positioning/navigation application) may be moving from point A to point B. As shown at 704, when the GNSS device 702 is configured to track the user's position without the assistance of map data, the tracked path may appear to be more non-linear and random due to errors and drifts from positioning measurements. For example, if the GNSS device 702 is capable of performing GNSS-based positioning, the detected position of the user may be few meters away from the actual position of the user when the user is in an urban area and the GNSS device 702 is unable to receive GNSS signals from satellites based on line-of-sight (LOS) conditions. In another example, if the GNSS device is capable of performing dead reckoning (DR) positioning, the detected position of the user may also be different from the actual position of the user when there is a magnetic field disturbance. As such, the tracked path may overlap with areas that are less likely to be accessed by the user (e.g., a building or an adjacent road), which may cause inaccuracy to the positioning of the user.

On the other hand, as shown at 706, when the GNSS device 702 is configured to track the user's position with the assistance of map data, the tracked path may appear to be more linear as the path of the user may be configured to fit to the paths available in the map data (e.g., to the closest line segment provided by the map data). For example, some positioning/navigation applications may include a feature, which may be referred to as a "snap-to-road" or "fit-to-road" feature, that enables the positioning/navigation applications to fit the position of a user to a nearby (or nearest) road/location on a navigation map when the GNSS signal is weak or sporadic. The feature may be similar to a map matching feature that ensures the GNSS data is tied to the road that a user is traveling on and doesn't jitter the user's tracks leading to confusion. As such, the tracked path of the user may be less likely to overlap with areas that the user has not accessed. Therefore, map data from a map vendor may be used to improve mobile/wearable/IoT devices positioning accuracy (which may be referred to as map aided positioning). In addition, in some scenarios, map data usage for positioning may not specify knowledge of the absolute map coordinates, but just specify relative information, e.g., coordinate offsets with respect to a reference position. Also, map aided positioning may not specify sharing of user location outside of the device to ensure user privacy, which meets the privacy standard specified by certain countries.

As described in connection with FIGS. 5 and 6, map data (e.g., two-dimensional (2D) and/or three-dimensional (3D)

map data) with position coordinates, for a variety of reasons, may just be available after undergoing a transformation and the transformation itself is unknown (e.g., converting WGS-84 coordinates to GCJ-02 coordinates and usage/disclosure of this transformation is illegal without a permit). Thus, in some scenarios, it may not be possible for manufacturers to integrate transformed map data (e.g., map data that is based on coordinates transformed from one coordinate system to another coordinate system) directly into positioning/navigation application on mobile device, wearables, IoT devices, etc. since the transformation is unknown.

Aspects presented herein may improve the performance of positioning devices, such as mobile devices, wearables, IoT devices, etc., by enabling the positioning devices to utilize transformed map data with limited third party knowledge of the transformation. Aspects presented herein may enable a positioning device to make the map data from another coordinate system not supported by the positioning device usable for positioning algorithms without knowledge of the transformation (e.g., without knowing there is a transformation of the coordinates). Aspects presented herein may enable map data to be integrated with a GNSS and sensor navigation filter, which integrates the GNSS sensor and map data directly into a Kalman filter to estimate user position and velocity. The map data may be used to impose specific constraints on the user position to improve position accuracy.

In one aspect of the present disclosure, a positioning device may use the knowledge that map data is referenced to some reference position in the transformed coordinate system. If a position in a known coordinate system corresponding to the same position in the transformed coordinate system is available, then assuming that the map data referenced to the reference position in the transformed coordinate system is able to be translated to the reference position in the known coordinate system, the map data may then be made usable for positioning applications without the knowledge of the actual transformation itself. For example, the positioning device may request map data of a region from an entity (e.g., a third party vendor) that has access to the transformation. The map data may be requested corresponding to a position in a known coordinate system. The entity that has access to the transformation may transform this reference position into the unknown coordinate system (e.g., unknown to the positioning device or the requestor of the map data). The entity may then get the map data corresponding to this transformed reference position and provide this map data with the transformed reference position to the GNSS device or the map data requestor. The availability of the reference position in the known coordinate system and the unknown coordinate system and the corresponding map data in the unknown co-ordinate system may allow the map data to become usable in positioning algorithms, such as for map aided positioning.

Figure 8:
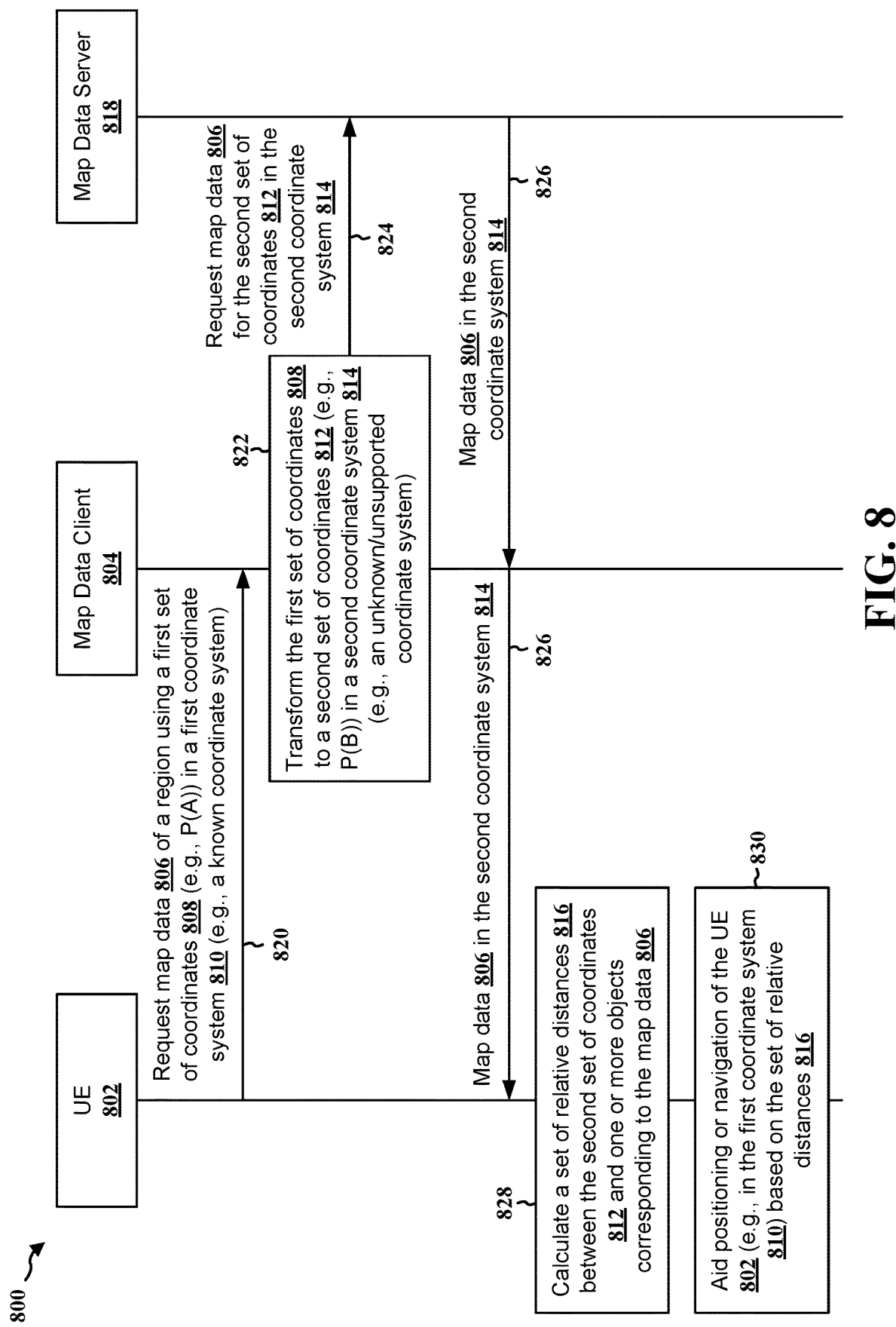
FIG. 8 is a communication flow illustrating an example of a UE using map data of a transformed coordinate system for aiding its positioning without or with limited knowledge of the actual transformation in accordance with various aspects of the present disclosure.

FIG. 8 is a communication flow 800 illustrating an example of a UE using map data of a transformed coordinate system for aiding its positioning without or with limited knowledge of the actual transformation in accordance with various aspects of the present disclosure. The numberings associated with the communication flow 800 do not specify a particular temporal order and are merely used as references for the communication flow 800. Aspects presented herein may enable a UE, such as a mobile device, a wearable, an IoT device, etc., to make map data from a transformed coordinate system (e.g., from a different coordinate system) usable for positioning algorithms (e.g., for aiding its positioning) without the knowledge of the transformation.

At 820, a UE 802 (e.g., a first entity) may request map data 806 of a region from a map data client 804 (e.g., a second entity) using a first set of coordinates 808 (e.g., P(A)) in a first coordinate system 810, where the first coordinate system 810 may be a known coordinate system for the UE 802 or supported by the UE 802. For example, the UE 802 may be a GPS/GNSS receiver that is capable of determining its coordinates based on the WGS-84 coordinate system (e.g., the first coordinate system 810), but the UE 802 may not support/know a second coordinate system 814, such as the GCJ-02 coordinate system and/or the BD-09 coordinate system. The UE 802 may request map data 806 associated with the second coordinate system 814 from the map data client 804 based on the first set of coordinates 808 (e.g., the WGS-84 coordinates), where the map data client 804 may be an entity that has the license/permission to convert coordinates from the first coordinate system 810 to the second coordinate system 814 (e.g., have the permission to convert the WGS-84 coordinates to the GCJ-02/BD-09 coordinates).

At 822, in response to the UE 802's request for the map data 806, the map data client 804 may convert the first set of coordinates 808 (e.g., WGS-84 coordinates) to a second set of coordinates 812 (e.g., GCJ-02/BD-09 coordinates) in the second coordinate system 814 (e.g., the GCJ-02/BD-09 coordinate system).

At 824, the map data client 804 may request the map data 806 from a map data server 818 (e.g., a third entity) that is associated with the second coordinate system 814 (e.g., a GCJ-02/BD-09 map server/provider) based on the second set of coordinates 812 (e.g., the GCJ-02/BD-09 coordinates).

At 826, in response to the map data client 804's request, the map data server 818 may transmit the map data 806 in the second coordinate system 814 to the map data client 804 for forwarding to the UE 802, or directly to the UE 802 depending on the configuration. For example, the map data server 818 may send GCJ-02/BD-09 map data to the map data client 804, and the map data client 804 may forward the GCJ-02/BD-09 map data to the UE 802.

As discussed in connection with FIGS. 5 and 6, the map data 806 may include a group of line segments that represent one or more objects/features in the region, such as roads, paths, pedestrian paths, building locations, and/or vehicle routes (e.g., automobile, boat, and/or airplane routes) of the region. In addition, as shown by FIG. 6, since the UE 802 does not support the second coordinate system 814 (e.g., the GCJ-02/BD-09 coordinate system), the map data 806 received by the UE 802 may include an offset from the actual region. For example, a street X in the map data 806 of the region may be offset by 100 meters in longitudinal direction and 200 meters in latitudinal direction from the actual street X of the region.

At 828, based on the map data 806 and the second set of coordinates 812, the UE 802 may calculate a set of relative distances 816 between the second set of coordinates 812 and one or more objects/features corresponding to the map data 806, such as roads, paths, and/or routes associated with the region. Then, at 830, the UE 802 may aid positioning or navigation of the UE 802 (e.g., in the first coordinate system 810) based on the set of relative distances 816.

Figure 9:
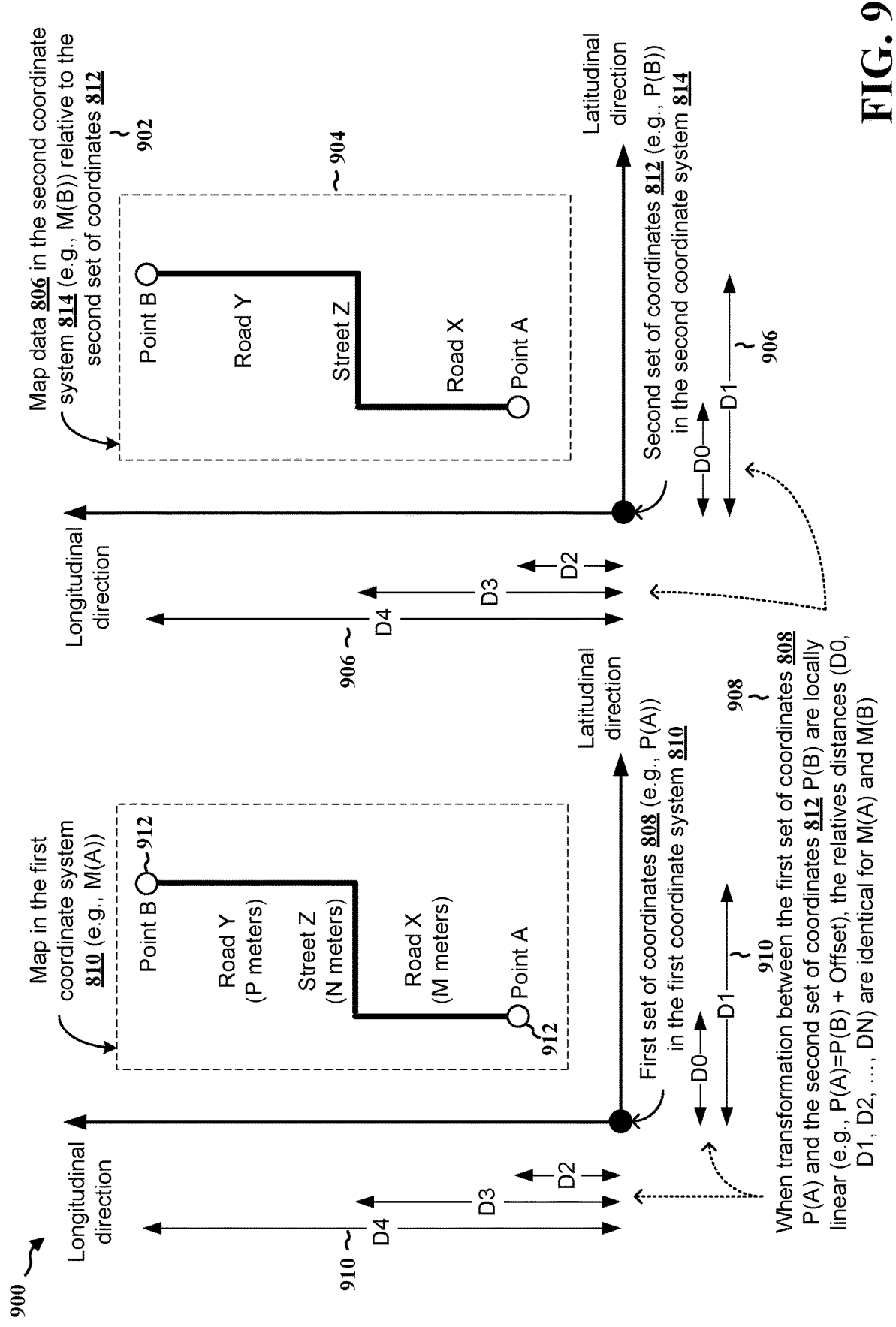
FIG. 9 is a diagram illustrating an example of calculating a set of relative distances from map data and using the calculated set of relative distances for map aided positioning in accordance with various aspects of the present disclosure.

FIG. 9 is a diagram 900 illustrating an example of calculating a set of relative distances from map data and using the calculated set of relative distances for map aided positioning in accordance with various aspects of the present disclosure. As shown at 902, after receiving the map data 806, the UE 802 may have a map (e.g., a group of line segments) that includes one or more features of the region (e.g., roads, pedestrian paths, ferry routes, etc.) relative to the second set of coordinates 812. Then, the UE 802 may calculate or obtain relative distances between the one or more features of the region and the second set of coordinates 812.

For example, as shown at 904, the map data 806 may include a road X, a road Y, and a street Z. Then, the UE 802 may calculate the relative distances (e.g., the set of relative distances 816) between the second set of coordinates 812 and the road X, the road Y, and the street Z. For example, the UE 802 may calculate and determine that the road X is D0 meters away from the second set of coordinates 812 in latitudinal direction, and that the road X extends from D2 meters to D3 meters relatively to the second set of coordinates 812 in longitudinal direction. The UE 802 may also calculate and determine that the road Y is D1 meters away from the second set of coordinates 812 in latitudinal direction, and that the road Y extends from D3 meters to D4 meters relatively to the second set of coordinates 812 in longitudinal direction. Similarly, the UE 802 may also calculate and determine that the street Z is D3 meters away from the second set of coordinates 812 in longitudinal direction, and that the road Y extends relatively to the second set of coordinates 812 from D3 meters to D4 meters in latitudinal direction, etc.

As shown at 908, when the transformation between the first set of coordinates 808 and the second set of coordinates 812 are locally linear (e.g., first set of coordinates 808=second set of coordinates 812+an offset amount), the relative distances (e.g., D0, D1, D2, D3, D4, . . . , DN) calculated at 906 between the second set of coordinates 812 and the road X, the road Y, and the street Z may be identical to the relative distance between the first set of coordinates 808 and the road X, the road Y, and the street Z, such as shown at 910. For example, although a coordinate (e.g., one of the first set of coordinates 808) on the first coordinate system 810 may have an offset amount of X meters/degrees (e.g., resulting from an obfuscation algorithm) from a corresponding coordinate (e.g., one of the second set of coordinates 812) on the second coordinate system 814, the relative distance between the coordinate and the road X may be identical as the relative distance between the corresponding coordinate and the road X. As such, the UE 802 may use the calculated relative distances for aiding the positioning and/or the navigation of the UE 802 under the first coordinate system 810 without generating or obtaining a map under the first coordinate system 810.

For example, if the UE 802 is at a position corresponding to the first set of coordinates 808, the UE 802 may guide a user from the first set of coordinates 808 to point A on the map by navigating the user to move D0 meters in latitudinal direction and D2 meters in longitudinal direction. In another example, as shown at 912, if the UE 802 is guiding a user from point A to point B under the first coordinate system 810, based on the relative distances obtained from the map data 806 of the second coordinate system 814, the UE 802 may inform the user to move M meters (e.g., D3 minus D2 meters) from point A towards north, and turn east (or turn right) and move N meters (e.g., D1 minus D0 meters), and then turn north (or turn left) and move P meters (e.g., D4 minus D3 meters), etc. In another example, as described in connection with FIG. 7, the UE 802 may also use the map data 806 to aid its positioning or position tracking, such as by fitting the position of the user (e.g., via the snap-to-fit feature) to a nearby (or nearest) road/location on the map data 806. For example, when the user is moving from point A to point B, the UE 802 may track/record the path of the user and based on the road X, street Z, and road Y.

As such, aspects presented herein may enable the UE 802 to use map data associated with the second coordinate system 814 to aid its positioning on the first coordinate system 810 without the knowledge of the coordinates transformation between the first coordinate system 810 and the second coordinate system 814, which may improve the positioning accuracy of the UE 802 under the first coordinate system 810 while enabling the UE 802 to comply with regulations in certain geographies (e.g., the prohibition of converting coordinates without a license/permit). In other words, the knowledge of transformation from the first coordinate system 810 to the second coordinate system 814 may just be known to and permitted by a third party application/vendor. However, usage of the transformation from the second coordinate system 814 to the first coordinate system 810 by the UE 802, the map data client 804, and the third party application/vendor may not be allowed/permitted.

Figure 10:
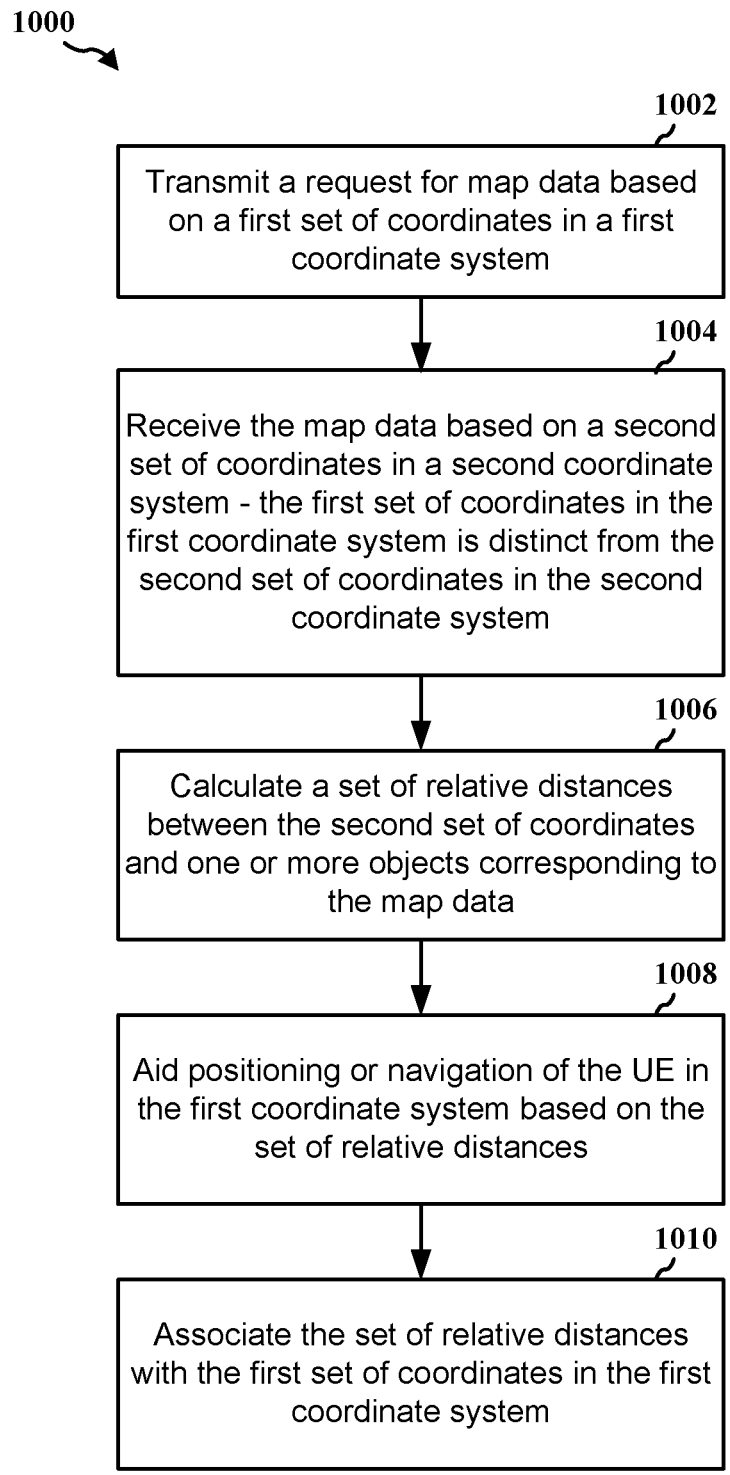
FIG. 10 is a flowchart of a method of wireless communication.

FIG. 10 is a flowchart 1000 of a method of wireless communication. The method may be performed by a UE (e.g., the UE 104, 404, 802; GNSS device 702; the apparatus 1204). The method may enable the UE, which may be a mobile device, wearables, IoT devices, or a device running a positioning application, etc. to utilize map data from another coordinate system (e.g., a coordinate system not supported by the UE) usable for positioning algorithms without knowledge of the transformation (e.g., without knowing there is a transformation of the coordinates between coordinate systems).

At 1002, the UE may transmit a request for map data based on a first set of coordinates in a first coordinate system, such as described in connection with FIG. 8. For example, at 820, the UE 802 may request map data 806 of a region from a map data client 804 using a first set of coordinates 808 in a first coordinate system 810 (e.g., a known coordinate system). The transmission of the request may be performed by, e.g., the map data reference component 198, the cellular baseband processor 1224, and/or the transceiver(s) 1222 of the apparatus 1204 in FIG. 12.

At 1004, the UE may receive the map data based on a second set of coordinates in a second coordinate system, where the first set of coordinates in the first coordinate system is distinct from the second set of coordinates in the second coordinate system, such as described in connection with FIG. 8. For example, at 826, the UE 802 may receive map data 806 in the second coordinate system 814 from the map data client 804 or from the map data server 818. The reception of the map data may be performed by, e.g., the map data reference component 198, the cellular baseband processor 1224, and/or the transceiver(s) 1222 of the apparatus 1204 in FIG. 12.

In one example, the first set of coordinates is distinct from the second set of coordinates by an offset amount. This may apply at least in the vicinity of the first set of co-ordinates, but may not be specified for long distances. In such an example, the offset amount is based on a linear transformation between the first set of coordinates in the first coordinate system and the second set of coordinates in the second coordinate system.

In another example, the first coordinate system is a World Geodetic System 1984 (WGS-84) coordinate system and the second coordinate system is at least one of a geodetic datum, a GCJ-02 coordinate system, or a BD-09 coordinate system.

In another example, the request for the map data is transmitted to at least one of a map data client or a map data server, and where the map data is received from at least one of the map data client or the map data server. In such an example, the first set of coordinates in the first coordinate system is transformed to the second set of coordinates in the second coordinate system via the map data client or a third party application (e.g., a third party vendor that provides transformation information to the map data client). In some examples, the map data client may have access to the transformation with the permission of the third party application/vendor.

In another example, the UE does not have a capability or a permission to operate under the second coordinate system.

In another example, the map data includes a group of line segments that represent the one or more objects corresponding to the map data. In such an example, the one or more objects include one or more roads, one or more building locations, one or more paths, one or more pedestrian paths, one or more vehicle routes, or a combination thereof, where the one or more vehicle routes are associated with at least one of an automobile, a boat, or an airplane.

At 1006, the UE may calculate a set of relative distances between the second set of coordinates and one or more objects corresponding to the map data, such as described in connection with FIGS. 8 and 9. For example, at 828, the UE 802 may calculate a set of relative distances 816 between the second set of coordinates 812 and one or more objects corresponding to the map data 806. The calculation of the set of relative distances may be performed by, e.g., the map data reference component 198 and/or the cellular baseband processor 1224 of the apparatus 1204 in FIG. 12.

In one example, the set of relative distances between the second set of coordinates and the one or more objects includes longitudinal coordinate offsets and latitudinal coordinate offsets for the one or more objects with respect to the second set of coordinates.

At 1008, the UE may aid positioning or navigation of the UE in the first coordinate system based on the set of relative distances, such as described in connection with FIGS. 8 and 9. For example, at 830, the UE 802 may aid positioning or navigation of the UE 802 (e.g., in the first coordinate system 810) based on the set of relative distances 816. The aiding of the positioning or navigation may be performed by, e.g., the map data reference component 198, the cellular baseband processor 1224, and/or the transceiver(s) 1222 of the apparatus 1204 in FIG. 12.

At 1010, the UE may associate (or apply) the set of relative distances with the first set of coordinates in the first coordinate system, such as described in connection with FIGS. 8 and 9. For example, as shown at 910, the UE 802 may associate a set of relative distances obtained from the second set of coordinates 812 and the map data 806 with the first set of coordinates 808 in the first coordinate system 810. The application of the set of relative distances may be performed by, e.g., the map data reference component 198, the cellular baseband processor 1224, and/or the transceiver(s) 1222 of the apparatus 1204 in FIG. 12.

Figure 11:
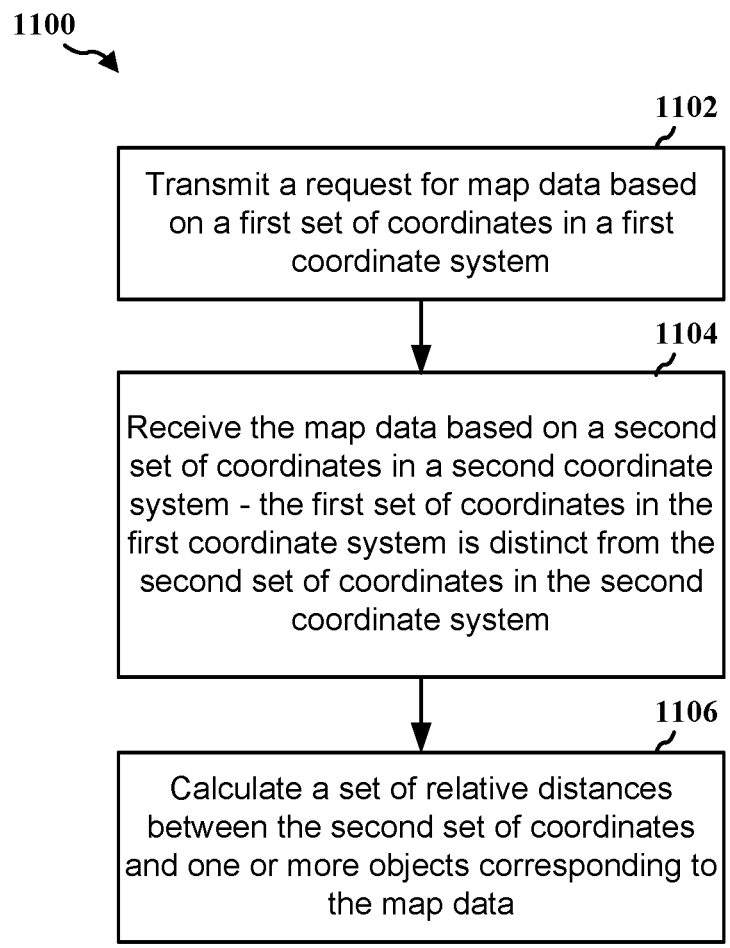
FIG. 11 is a flowchart of a method of wireless communication.

FIG. 11 is a flowchart 1100 of a method of wireless communication. The method may be performed by a UE (e.g., the UE 104, 404, 802; GNSS device 702; the apparatus 1204). The method may enable the UE, which may be a mobile device, wearables, IoT devices, or a device running a positioning application, etc. to utilize map data from another coordinate system (e.g., a coordinate system not supported by the UE) usable for positioning algorithms without knowledge of the transformation (e.g., without knowing there is a transformation of the coordinates between coordinate systems).

At 1102, the UE may transmit a request for map data based on a first set of coordinates in a first coordinate system, such as described in connection with FIG. 8. For example, at 820, the UE 802 may request map data 806 of a region from a map data client 804 using a first set of coordinates 808 in a first coordinate system 810 (e.g., a known coordinate system). The transmission of the request may be performed by, e.g., the map data reference component 198, the cellular baseband processor 1224, and/or the transceiver(s) 1222 of the apparatus 1204 in FIG. 12.

At 1104, the UE may receive the map data based on a second set of coordinates in a second coordinate system, where the first set of coordinates in the first coordinate system is distinct from the second set of coordinates in the second coordinate system, such as described in connection with FIG. 8. For example, at 826, the UE 802 may receive map data 806 in the second coordinate system 814 from the map data client 804 or from the map data server 818. The reception of the map data may be performed by, e.g., the map data reference component 198, the cellular baseband processor 1224, and/or the transceiver(s) 1222 of the apparatus 1204 in FIG. 12.

In one example, the first set of coordinates is distinct from the second set of coordinates by an offset amount. In such an example, the offset amount is based on a linear transformation between the first set of coordinates in the first coordinate system and the second set of coordinates in the second coordinate system.

In another example, the first coordinate system is a World Geodetic System 1984 (WGS-84) coordinate system and the second coordinate system is at least one of a geodetic datum, a GCJ-02 coordinate system, or a BD-09 coordinate system.

In another example, the request for the map data is transmitted to at least one of a map data client or a map data server, and where the map data is received from at least one of the map data client or the map data server. In such an example, the first set of coordinates in the first coordinate system is transformed to the second set of coordinates in the second coordinate system via the map data client or a third party application.

In another example, the UE does not have a capability or a permission to operate under the second coordinate system.

In another example, the map data includes a group of line segments that represent the one or more objects corresponding to the map data. In such an example, the one or more objects include one or more roads, one or more building locations, one or more paths, one or more pedestrian paths, one or more vehicle routes, or a combination thereof, where the one or more vehicle routes are associated with at least one of an automobile, a boat, or an airplane.

At 1106, the UE may calculate a set of relative distances between the second set of coordinates and one or more objects corresponding to the map data, such as described in connection with FIGS. 8 and 9. For example, at 828, the UE 802 may calculate a set of relative distances 816 between the second set of coordinates 812 and one or more objects corresponding to the map data 806. The calculation of the set of relative distances may be performed by, e.g., the map data reference component 198 and/or the cellular baseband processor 1224 of the apparatus 1204 in FIG. 12.

In one example, the set of relative distances between the second set of coordinates and the one or more objects includes longitudinal coordinate offsets and latitudinal coordinate offsets for the one or more objects with respect to the second set of coordinates.

In another example, the UE may aid positioning or navigation of the UE in the first coordinate system based on the set of relative distances, such as described in connection with FIGS. 8 and 9. For example, at 830, the UE 802 may aid positioning or navigation of the UE 802 (e.g., in the first coordinate system 810) based on the set of relative distances 816. The aiding of the positioning or navigation may be performed by, e.g., the map data reference component 198, the cellular baseband processor 1224, and/or the transceiver(s) 1222 of the apparatus 1204 in FIG. 12.

In another example, the UE may associate the set of relative distances with the first set of coordinates in the first coordinate system, such as described in connection with FIGS. 8 and 9. For example, as shown at 910, the UE 802 may associate or apply a set of relative distances obtained from the second set of coordinates 812 and the map data 806 with the first set of coordinates 808 in the first coordinate system 810. The application of the set of relative distances may be performed by, e.g., the map data reference component 198, the cellular baseband processor 1224, and/or the transceiver(s) 1222 of the apparatus 1204 in FIG. 12.

Figure 12:
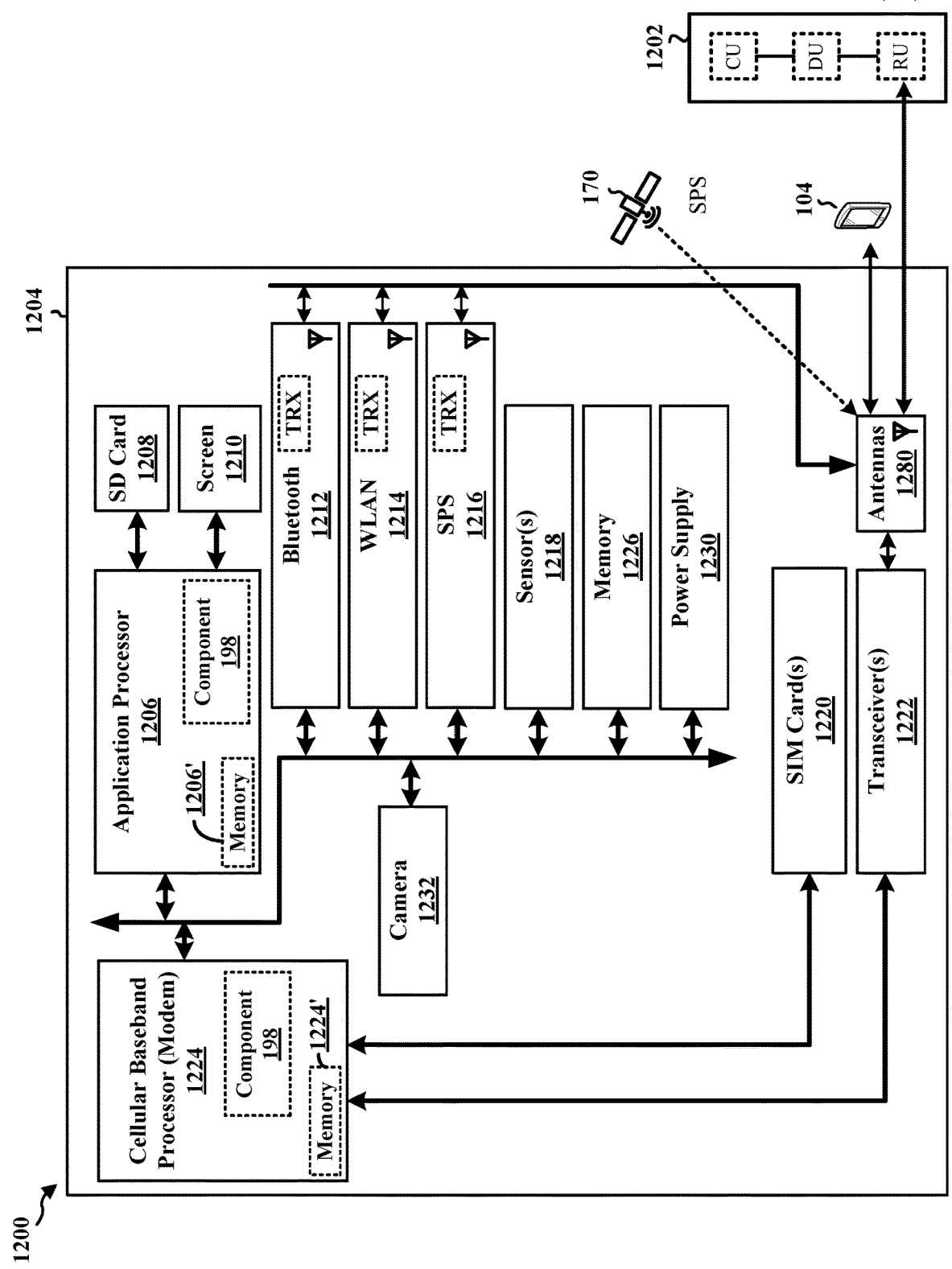
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the map data reference component 198 may be configured to transmit a request for map data based on a first set of coordinates in a first coordinate system. The map data reference component 198 may also be configured to receive the map data based on a second set of coordinates in a second coordinate system, where the first set of coordinates in the first coordinate system is distinct from the second set of coordinates in the second coordinate system. The map data reference component 198 may also be configured to calculate a set of relative distances between the second set of coordinates and one or more objects corresponding to the map data. The map data reference component 198 may be within the cellular baseband processor 1224, the application processor 1206, or both the cellular baseband processor 1224 and the application processor 1206. The map data reference component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for transmitting a request for map data based on a first set of coordinates in a first coordinate system. The apparatus 1204 may further include means for receiving the map data based on a second set of coordinates in a second coordinate system, where the first set of coordinates in the first coordinate system is distinct from the second set of coordinates in the second coordinate system. The apparatus 1204 may further include means for calculating a set of relative distances between the second set of coordinates and one or more objects corresponding to the map data.

In one configuration, the apparatus 1204 may further include means for aiding positioning or navigation of the UE in the first coordinate system based on the set of relative distances.

In another configuration, the apparatus 1204 may further include means for associating the set of relative distances with the first set of coordinates in the first coordinate system.

In another configuration, the first set of coordinates is distinct from the second set of coordinates by an offset amount. In such a configuration, the offset amount is based on a linear transformation between the first set of coordinates in the first coordinate system and the second set of coordinates in the second coordinate system.

In another configuration, the first coordinate system is a WGS-84 coordinate system and the second coordinate system is at least one of a geodetic datum, a GCJ-02 coordinate system, or a BD-09 coordinate system.

In another configuration, the request for the map data is transmitted to at least one of a map data client or a map data server, and where the map data is received from at least one of the map data client or the map data server. In such a configuration, the first set of coordinates in the first coordinate system is transformed to the second set of coordinates in the second coordinate system via the map data client or a third party application.

In another configuration, the UE does not have a capability or a permission to operate under the second coordinate system.

In another configuration, the map data includes a group of line segments that represent the one or more objects corresponding to the map data. In such a configuration, the one or more objects include one or more roads, one or more building locations, one or more paths, one or more pedestrian paths, one or more vehicle routes, or a combination thereof, where the one or more vehicle routes are associated with at least one of an automobile, a boat, or an airplane.

In another configuration, the set of relative distances between the second set of coordinates and the one or more objects includes longitudinal coordinate offsets and latitudinal coordinate offsets for the one or more objects with respect to the second set of coordinates.

The means may be the map data reference component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: transmitting a request for map data based on a first set of coordinates in a first coordinate system; receiving the map data based on a second set of coordinates in a second coordinate system, where the first set of coordinates in the first coordinate system is distinct from the second set of coordinates in the second coordinate system; and calculating a set of relative distances between the second set of coordinates and one or more objects corresponding to the map data.

Aspect 2 is the method of aspect 1, further including: aiding positioning or navigation of the UE in the first coordinate system based on the set of relative distances.

Aspect 3 is the method of any of aspects 1 or 2, further including: associating the set of relative distances with the first set of coordinates in the first coordinate system.

Aspect 4 is the method of any of aspects 1 to 3, where the first set of coordinates is distinct from the second set of coordinates by an offset amount.

Aspect 5 is the method of aspect 4, where the offset amount is based on a linear transformation between the first set of coordinates in the first coordinate system and the second set of coordinates in the second coordinate system.

Aspect 6 is the method of any of aspects 1 to 5, where the first coordinate system is a WGS-84 coordinate system and the second coordinate system is at least one of a geodetic datum, a GCJ-02 coordinate system, or a BD-09 coordinate system.

Aspect 7 is the method of any of aspects 1 to 6, where the request for the map data is transmitted to at least one of a map data client or a map data server, and where the map data is received from at least one of the map data client or the map data server.

Aspect 8 is the method of aspect 7, where the first set of coordinates in the first coordinate system is transformed to the second set of coordinates in the second coordinate system via the map data client or a third party application.

Aspect 9 is the method of any of aspects 1 to 8, where the UE does not have a capability or a permission to operate under the second coordinate system.

Aspect 10 is the method of any of aspects 1 to 9, where the set of relative distances between the second set of coordinates and the one or more objects includes longitudinal coordinate offsets and latitudinal coordinate offsets for the one or more objects with respect to the second set of coordinates.

Aspect 11 is the method of any of aspects 1 to 10, where the map data includes a group of line segments that represent the one or more objects corresponding to the map data.

Aspect 12 is the method of aspect 11, where the one or more objects include one or more roads, one or more building locations, one or more paths, one or more pedestrian paths, one or more vehicle routes, or a combination thereof, where the one or more vehicle routes are associated with at least one of an automobile, a boat, or an airplane.

Aspect 13 is an apparatus for wireless communication at a UE, including: a memory; and at least one processor coupled to the memory and, based at least in part on information stored in the memory, the at least one processor is configured to implement any of aspects 1 to 12.

Aspect 14 is the apparatus of aspect 13, further including at least one of a transceiver or an antenna coupled to the at least one processor, where the transceiver or the antenna is configured to transmit the request for map data, and where the transceiver or the antenna is configured to receive the map data.

Aspect 15 is an apparatus for wireless communication including means for implementing any of aspects 1 to 12.

Aspect 16 is a computer-readable medium (e.g., a non-transitory computer-readable medium) storing computer executable code, where the code when executed by a processor causes the processor to implement any of aspects 1 to 12.

What is claimed is:

1. An apparatus for wireless communication at a user equipment (UE), comprising:
    at least one of a transceiver or an antenna;
    a memory; and
    at least one processor coupled to the memory and at least one of the transceiver or the antenna and, based at least in part on information stored in the memory, the at least one processor is configured to:
    transmit, to at least one of a map data client or a map data server via at least one of the transceiver or the antenna, a request for map data based on a first set of coordinates in a first coordinate system;
    receive, from at least one of the map data client or the map data server via at least one of the transceiver or the antenna, the map data based on a second set of coordinates in a second coordinate system, wherein the first set of coordinates in the first coordinate system is distinct from the second set of coordinates in the second coordinate system; and
    calculate a set of relative distances between the second set of coordinates and one or more objects corresponding to the map data.

2. The apparatus of claim 1, wherein the at least one processor is further configured to:
    aid positioning or navigation of the UE in the first coordinate system based on the set of relative distances.

3. The apparatus of claim 1, wherein the at least one processor is further configured to:
    associate the set of relative distances with the first set of coordinates in the first coordinate system.

4. The apparatus of claim 1, wherein the first set of coordinates is distinct from the second set of coordinates by an offset amount.

5. The apparatus of claim 4, wherein the offset amount is based on a linear transformation between the first set of coordinates in the first coordinate system and the second set of coordinates in the second coordinate system.

6. The apparatus of claim 1, wherein the first coordinate system is a World Geodetic System 1984 (WGS-84) coordinate system and the second coordinate system is at least one of a geodetic datum, a GCJ-02 coordinate system, or a BD-09 coordinate system.

7. The apparatus of claim 1, wherein the first set of coordinates in the first coordinate system is transformed to the second set of coordinates in the second coordinate system via the map data client or a third party application.

8. The apparatus of claim 1, wherein the UE does not have a capability or a permission to operate under the second coordinate system.

9. The apparatus of claim 1, wherein the set of relative distances between the second set of coordinates and the one or more objects includes longitudinal coordinate offsets and latitudinal coordinate offsets for the one or more objects with respect to the second set of coordinates.

10. The apparatus of claim 1, wherein the map data includes a group of line segments that represent the one or more objects corresponding to the map data.

11. The apparatus of claim 10, wherein the one or more objects include one or more roads, one or more building locations, one or more paths, one or more pedestrian paths, one or more vehicle routes, or a combination thereof, wherein the one or more vehicle routes are associated with at least one of an automobile, a boat, or an airplane.

12. A method of wireless communication at a user equipment (UE), comprising:
    transmitting, to at least one of a map data client or a map data server via at least one of a transceiver or an antenna, a request for map data based on a first set of coordinates in a first coordinate system;
    receiving, from at least one of the map data client or the map data server via at least one of the transceiver or the antenna, the map data based on a second set of coordinates in a second coordinate system, wherein the first set of coordinates in the first coordinate system is distinct from the second set of coordinates in the second coordinate system; and
    calculating a set of relative distances between the second set of coordinates and one or more objects corresponding to the map data.

13. The method of claim 12, further comprising:
    aiding positioning or navigation of the UE in the first coordinate system based on the set of relative distances.

14. The method of claim 12, further comprising:
    associating the set of relative distances with the first set of coordinates in the first coordinate system.

15. The method of claim 12, wherein the first set of coordinates is distinct from the second set of coordinates by an offset amount.

16. The method of claim 15, wherein the offset amount is based on a linear transformation between the first set of coordinates in the first coordinate system and the second set of coordinates in the second coordinate system.

17. The method of claim 12, wherein the first coordinate system is a World Geodetic System 1984 (WGS-84) coordinate system and the second coordinate system is at least one of a geodetic datum, a GCJ-02 coordinate system, or a BD-09 coordinate system.

18. The method of claim 12, wherein the first set of coordinates in the first coordinate system is transformed to the second set of coordinates in the second coordinate system via the map data client or a third party application.

19. The method of claim 12, wherein the UE does not have a capability or a permission to operate under the second coordinate system.

20. The method of claim 12, wherein the set of relative distances between the second set of coordinates and the one or more objects includes longitudinal coordinate offsets and latitudinal coordinate offsets for the one or more objects with respect to the second set of coordinates.

21. The method of claim 12, wherein the map data includes a group of line segments that represent the one or more objects corresponding to the map data.

22. The method of claim 21, wherein the one or more objects include one or more roads, one or more building locations, one or more paths, one or more pedestrian paths, one or more vehicle routes, or a combination thereof, wherein the one or more vehicle routes are associated with at least one of an automobile, a boat, or an airplane.

23. An apparatus for wireless communication at a user equipment (UE), comprising:
    means for transmitting, to at least one of a map data client or a map data server via at least one of a transceiver or an antenna, a request for map data based on a first set of coordinates in a first coordinate system;
    means for receiving, from at least one of the map data client or the map data server via at least one of the transceiver or the antenna, the map data based on a second set of coordinates in a second coordinate system, wherein the first set of coordinates in the first coordinate system is distinct from the second set of coordinates in the second coordinate system; and
    means for calculating a set of relative distances between the second set of coordinates and one or more objects corresponding to the map data.

24. A computer-readable medium storing computer executable code at a user equipment (UE), the code when executed by a processor causes the processor to:
    transmit, to at least one of a map data client or a map data server via at least one of a transceiver or an antenna, a request for map data based on a first set of coordinates in a first coordinate system;
    receive, from at least one of the map data client or the map data server via at least one of the transceiver or the antenna, the map data based on a second set of coordinates in a second coordinate system, wherein the first set of coordinates in the first coordinate system is distinct from the second set of coordinates in the second coordinate system; and
    calculate a set of relative distances between the second set of coordinates and one or more objects corresponding to the map data.

* * * * *